Patented Mar. 28, 1950

2,501,859

UNITED STATES PATENT OFFICE 2,501,859

SPACER OR MOLD SURFACE FOR THE VULCANIZATION OF RUBBER

Bethel J. Babbitt, Riverside, and Glen R. Simmons, Chicago, Ill., assignors to Western Electric Company, Incorporated, New York, N. Y., a corporation of New York No Drawing. Application October 22, 1947, Serial No. 781,500

7 Claims. (Cl. 75—175)

This invention relates to a metallic spacer or mold surface for vulcanizing rubber and more particularly to such a spacer made of alloys comprising tin alloyed with either zinc or cadmium or a combination of both or tin alloyed with either zinc and lead or cadmium and lead or a combination of both and being adapted for use as liner sheets between layers of rubber during the vulcanization of the rubber.

In the past, the vulcanization of sheets of rubber has usually been effected by assembling stacks of sheets of unvulcanized rubber having a sheet of pure tin or tin alloy interposed between each adjacent pair of sheets of rubber whereby a plurality of sheets may be vulcanized at one time in the same apparatus and thereafter the sheets of tin may be stripped from sheets of rubber and reused until the sheets of tin become bent or creased, whereupon the sheets of tin may be remelted and rolled into sheet stock again in order to give the desired smoothness to the rubber product being made. In the course of remelting the tin, some impurities may creep into the melt.

In following the process outlined above, at times the sheets of rubber, when taken from the vulcanizing chamber, have a metallic luster on the surface thereof, probably due to the aforementioned impurities. The metallic luster, because it is unsightly and causes low insulation resistance, is highly undesirable and necessitates the dipping of the rubber sheet in strong acid solutions to remove the metallic lustrous coating from the rubber sheet.

It is an object of the present invention to provide a new and improved spacer or molding surface primarily of tin, which may be used as an interleaving sheet in the vulcanization of rubber sheets without causing a metallic luster to appear on the sheets of rubber during their vulcanization.

The phenomenon of metallic luster may appear sporadically in the processing of hard rubber sheets, especially in sheets made from synthetic and reclaimed rubber and, as far as is known, the cause of it has never been previously determined. Accordingly, experiments were undertaken to determine the cause of this and to provide means for eliminating the undesirable condition. Spectrographic analyses made on scrapings of metallic luster indicated the presence of copper and of chromium, as well as tin, lead and antimony comprising the alloy from which the liner sheets were made. Analyses of the acid dipping solution, which had been used for removing the metallic luster from numerous sheets of rubber, showed the presence of large amounts of aluminum, iron, nickel and traces of copper and chromium. By adding copper in the amounts of .01% to .1% to the tin alloy prior to casting, it was shown that the presence of copper in the sheet made from this tin alloy invariably caused pronounced metallic luster.

It was noted that where the metallic luster appeared on the sheets of rubber, the rubber sheets were easily removable from the tin sheets and were not accompanied by appreciable sticking of the tin sheets to the hard rubber sheets. This, together with the fact that copper appeared to be an important factor, suggested a working hypothesis of the mechanism of the formation of metallic luster. This hypothesis postulates that the first step consists of the corrosion of metals in the surface of the sheet to form compounds, and, secondly, the reduction of such compounds to metals on the surface of the rubber in a manner somewhat similar to the formation of silver mirrors on glass. This hypothesis suggested that the incorporation of an active metal, such as aluminum or zinc, in a tin alloy sheet might confine corrosion to this active metal, which would, in the second phase, be difficult to reduce and thus prevent metallic luster.

Accordingly, two sheets were made up of alloys containing, respectively, .1% copper and .25% aluminum, balance tin; and .25% aluminum, balance tin. Sheets of hard rubber vulcanized between sheets rolled from these alloys showed no metallic luster. The aluminum-bearing tin alloys were almost disintegrated by the action of the water during the vulcanization reaction and were removable from the surface of the rubber sheet only in small brittle pieces. Although the tin-aluminum alloy sheets can only be used once as liner sheets for sheets of rubber and have to be remelted and rerolled, they, nevertheless, are successful in preventing the formation of metallic luster on the sheets of rubber vulcanized between them.

Zinc was then tried as a substitute for aluminum and two alloys were made up containing, respectively, .1% copper and .2% zinc, balance tin; and .2% zinc, balance tin. Hard rubber sheets vulcanized between sheets rolled from the tin-copper-zinc and the tin-zinc alloys were free from metallic luster. Sheets made from tin-zinc alloys consisting of from .01% to .5% of zinc and the balance tin were used for plating sheets of hard rubber before vulcanization and proved effective in preventing the formation of metallic luster on the hard rubber sheets. By adding lead to the zinc-tin alloys, softer alloys were formed which facilitated the rolling of sheets therefrom. Sheets of tin-zinc-lead alloys comprising from .05% to .5% zinc, from .1% to 8.0% lead, and the remainder tin, when used as liners for hard rubber sheets during their vulcanization, served to prevent the formation of metallic luster on the hard rubber sheets.

Cadmium, which is less active chemically and more malleable and ductile than zinc, was used as a substitute for zinc to form cadmium-bearing tin alloys consisting of from .1% to 2.5% cadmium and the remainder tin. Ingots of these tin-cadmium alloys, which were softer than those of tin-zinc, may be more easily rolled into sheets. Tin-cadmium sheets used as separators for the rubber sheets during the vulcanization thereof were effective in producing hard rubber sheets free of metallic luster but were accompanied by a tendency to stick to the rubber sheets. If desired, lead may be added to the tin-cadmium alloys to produce softer alloys which may more readily be rolled into sheets. The tin-cadmium-lead alloys comprising from .05% to 2.5% cadmium, from 0.1% to 8.0% lead and the remainder tin, when rolled into sheets and used as plating sheets for rubber sheets during the vulcanization thereof, are effective in preventing the formation of the metallic luster on the rubber.

To secure the benefits of the reduced non-sticking property of the tin-zinc alloy and the ease-of-rolling property of the tin-cadmium alloy, tin-cadmium-zinc alloys were formed comprising from .05% to 2.5% cadmium, .05% to .5% zinc and the remainder tin. Sheets rolled from these tin-cadmium-zinc alloys, when used as separator sheets in the vulcanization of sheet rubber, were highly satisfactory in that they prevented the formation of metallic luster on the hard rubber sheets and also prevented excessive sticking of the tin alloy sheets to the hard rubber sheets. To the tin-cadmium-zinc alloys may be added various amounts of lead to form softer alloys consisting of zinc from .05% to .5%, cadmium from .05% to 2.5%, lead from .1% to 8.0%, and the remainder tin. Like sheets of the tin-zinc-cadmium alloys, separator sheets made from the tin-zinc-cadmium-lead alloys and used as liner sheets in the vulcanization of sheets of hard rubber are effective in preventing the formation of metallic luster on the hard rubber sheets and do not have a pronounced tendency to stick thereto.

From the foregoing description, it will be seen that various alloys of tin; namely, tin-zinc, tin-cadmium, tin-zinc-cadmium, or any of the above with lead added thereto are suitable for use as liner sheets for sheet rubber during the vulcanization of the rubber to prevent the formation of luster on the hard rubber sheets.

What is claimed is:

1. A spacer for use between rubber sheets during the vulcanization thereof consisting of 0.5% to .5% zinc, .1% to 8.0% lead and the remainder tin.

2. A spacer for use between rubber sheets during the vulcanization thereof consisting of 0.5% to 2.5% cadmium, .1% to 8.0% lead, and the remainder tin.

3. A spacer for use between rubber sheets during the vulcanization thereof consisting of .05% to .5% zinc, .05% to 2.5% cadmium, .1% to 8.0% lead, and the remainder tin.

4. A spacer for use between rubber sheets during the vulcanization thereof consisting of approximately .1% zinc, approximately 1.5% lead and the remainder tin.

5. A spacer for use between rubber sheets during the vulcanization thereof consisting of approximately .5% cadmium, approximately 1.5% lead and the remainder tin.

6. A spacer for use between the rubber sheets during the vulcanization thereof consisting of approximately .1% zinc, approximately .5% cadmium, 1.5% lead, and the remainder tin.

7. A spacer for use between rubber sheets during the vulcanization thereof consisting of lead from .1% to 8.0%, at least one metal selected from the group consisting of cadmium and zinc in the amounts of from .05% to 2.5% cadmium and from .05% to .5% zinc, and the remainder tin.

BETHEL J. BABBITT.
GLEN R. SIMMONS.

REFERENCES CITED

The following references are of record in the file of this patent:

UNITED STATES PATENTS

| Number | Name | Date |
|---|---|---|
| 71,479 | Gruneberg | Nov. 26, 1867 |
| 1,359,919 | Reardon | Nov. 23, 1920 |
| 1,437,641 | Ferriere et al. | Dec. 5, 1922 |
| 2,109,387 | Hanson et al. | Feb. 22, 1938 |
| 2,151,302 | Scheller | Mar. 21, 1939 |
| 2,180,137 | Bell et al. | Nov. 14, 1939 |
| 2,252,409 | Riesmeyer | Aug. 12, 1941 |
| 2,252,410 | Riesmeyer | Aug. 12, 1941 |

FOREIGN PATENTS

| Number | Country | Date |
|---|---|---|
| 41,100 | Austria | Feb. 25, 1910 |

OTHER REFERENCES

Mantell: "Tin," 1929, page 234 pub. by Chemical Catalog Co., New York.